United States Patent
Puhakka et al.

(10) Patent No.: US 6,327,767 B1
(45) Date of Patent: Dec. 11, 2001

(54) METHOD AND APPARATUS FOR THE CONTINUOUS MANUFACTURE OF FIBER-OPTIC CABLE

(75) Inventors: Timo Puhakka, Espoo; Leevi Karvonen, Jääli; Markku T. Suvanto, Espoo, all of (FI)

(73) Assignee: NK Cables Oy, Espo (FI)

( * ) Notice: Subject to any disclaimer, the term of this patent is extended or adjusted under 35 U.S.C. 154(b) by 0 days.

(21) Appl. No.: 09/194,114
(22) PCT Filed: May 16, 1997
(86) PCT No.: PCT/FI97/00287
  § 371 Date: Dec. 31, 1998
  § 102(e) Date: Dec. 31, 1998
(87) PCT Pub. No.: WO97/44694
  PCT Pub. Date: Nov. 27, 1997

(30) Foreign Application Priority Data

May 23, 1996 (FI) .......................................... 962189

(51) Int. Cl.[7] .................................................. B23Q 17/00
(52) U.S. Cl. .......................... 29/407.01; 29/460; 29/714; 29/779; 29/820; 427/118; 427/163.2; 264/1.29; 385/106
(58) Field of Search .............................. 29/868, 869, 872, 29/458, 460, 527.2, 755, 799, 820, 407.01, 714; 427/118, 163.2, 299, 434.7; 264/1.28, 1.29; 385/95, 106, 114

(56) References Cited

U.S. PATENT DOCUMENTS

| | | | |
|---|---|---|---|
| 2,427,507 | * 9/1947 | Powell, 3D et al. | 57/164 |
| 4,129,468 | * 12/1978 | Knab | 156/148 |
| 4,541,970 | * 9/1985 | Caverly, Jr. et al. | 264/1.5 |

FOREIGN PATENT DOCUMENTS

| 2443412 | * 8/1980 | (FR) . |
|---|---|---|
| A1-2564987 | 11/1985 | (FR) . |

* cited by examiner

Primary Examiner—S. Thomas Hughes
Assistant Examiner—Jermie E. Cozart

(57) ABSTRACT

The present invention relates to a method and apparatus for continuous manufacture of a fiber-optic cable. According to the method, single optical fibers of certain length are formed into a fiber-optic cable enclosed by a secondary sheath. Further, a certain length of the optical fibers is accumulated into an active buffer, and the end of an exhausting fiber is connected by a splice to the end of a new fiber, while the fiber is being fed into the process during the splicing operation from the buffer.

14 Claims, 2 Drawing Sheets

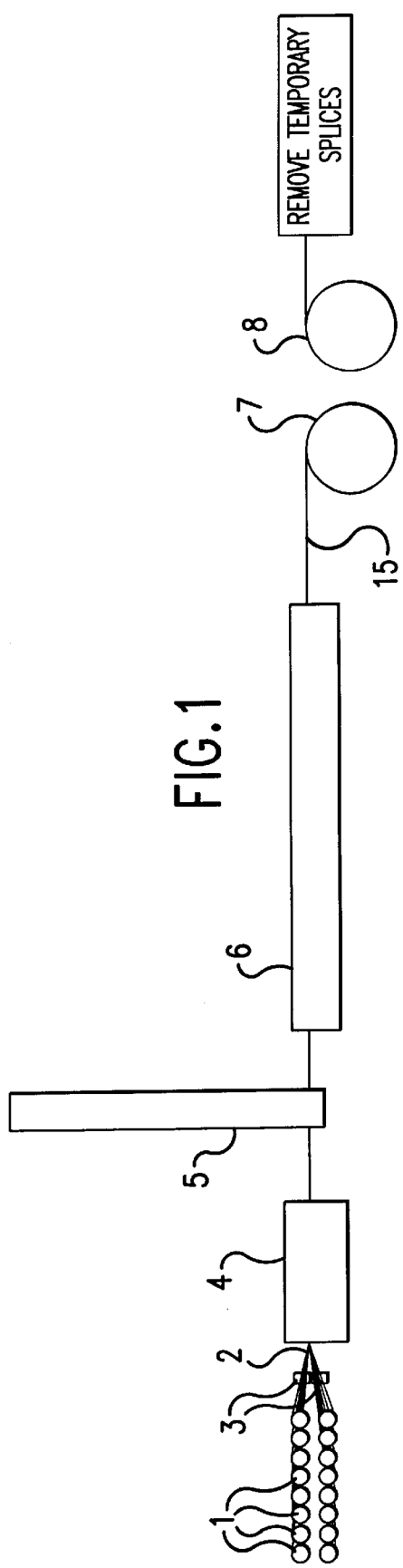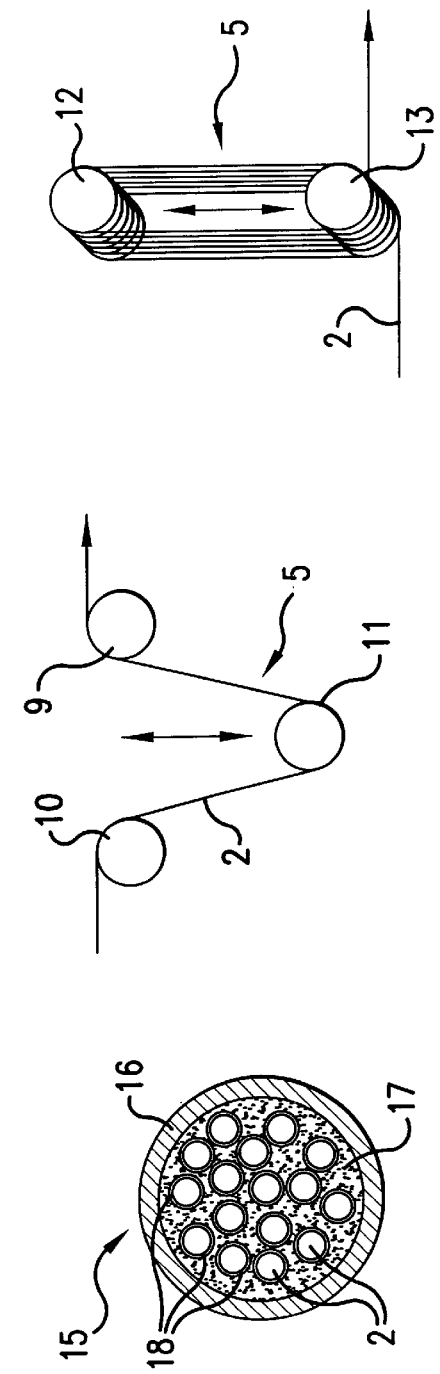

METHOD AND APPARATUS FOR THE CONTINUOUS MANUFACTURE OF FIBER-OPTIC CABLE

This application is the national phase under 35 U.S.C. §371 of prior PCT International Application No. PCT/FI97/00287 which has an International filing date of May 16, 1997 which designated the United States of America, the entire contents of which are hereby incorporated by reference.

FIELD OF THE INVENTION

The present invention relates to a method for continuously manufacturing fiber-optic cable.

The present invention also relates to an apparatus for continuously manufacturing fiber-optic cable.

BACKGROUND OF THE INVENTION

A viable method for continuously manufacturing fiber-optic cable is not known from conventional patent literature. FR patent No. 2,564,987 describes a system in which optical fibers are reeled off from cylindrical fiber reels in the axial direction of the reels, whereby the goal of the invention is to achieve a continuous fiber-optic cable manufacturing process by way of splicing the tail of exhausting reels to the start end of a new reel during the process. This method does not make use of an fiber buffer, but instead, the fiber reserve is located resting in containers which have no capability of active take-up or reel-off of fiber during the splicing operation. This method has a number of serious disadvantages. For instance, the fiber reels received from the fiber supplier must be unwound and re-coiled into the containers, which is a time-consuming step. A more serious complication is related to the fiber reel-off direction. Namely, the reeling-off of the fiber in the axial direction of the reel can cause sticking of the fiber between the underlaying fiber turns that may cut the fiber. Furthermore, this solution has no reliable means of detecting the end of an exhausting fiber reel, and any possible fiber damage during the fiber reel-off halts the entire cable manufacturing process.

The traditional discontinuous cable manufacturing process in turn is hampered by losses through discarded material in the process start-up and shut-down phases, and the long start-up time of the process. Moreover, when a fiber lot is ordered from a supplier trimmed to a specified length, in practice the delivered lot always contains a certain number of shorter fibers trimmed exactly to the specified length, while the other fibers may be somewhat overlength, whereby typically about 7% of the fiber material is lost due to the trimming of the overlength fibers in this conventional process. The shut-down and start-up losses of this process are in the order of a few percent, which causes the overall material loss of the conventional process to be about 10%.

SUMMARY OF THE INVENTION

It is an object of the present invention to overcome the disadvantages of the above-described techniques and offer an entirely novel type of method and apparatus for continuously manufacturing fiber-optic cable.

The goal of the invention is achieved by providing the cable manufacturing process with a fiber buffer serving to facilitate run-time splicing of the fiber.

More specifically, the method according to the present invention includes accumulating fibers in an active buffer during the manufacture process, joining the end of an exhausting fiber with the end of a new fiber, and reeling off the fiber to the manufacturing process from the active buffer during the splicing operation.

Furthermore, the apparatus according to the present invention includes a splicing device suitable for forming a splice between the optical fibers, and an active buffer suitable for continuously feeding the optical fibers into the manufacturing process arranged after the splicing device and during the splicing operation.

The present invention offers significant benefits.

The present continuous process can offer at least a 20% increase in the cable manufacturing capacity. By making optically functional splices of the fiber ends, the material savings can be as high as ten percent. Even if only temporary factory splices are used to join the fiber ends, the fiber raw material savings may be several percent as the start-up and shut-down losses of the process are eliminated.

The present invention will become more fully understood from the detailed description given hereinbelow and the accompanying drawings which are given by way of illustration only, and thus are not limitative of the present invention, and wherein:

FIG. 1 is a diagrammatic side view of an apparatus according to the present invention;

FIG. 2 is a cross section of a fiber-optic cable manufactured using the method according to the present invention;

FIG. 3 is a side view of a fiber buffer in an apparatus according to the present invention;

FIG. 4 is a side view of another embodiment of a fiber buffer according to the present invention;

DETAILED DESCRIPTION OF PREFERRED EMBODIMENTS

Figure 5:
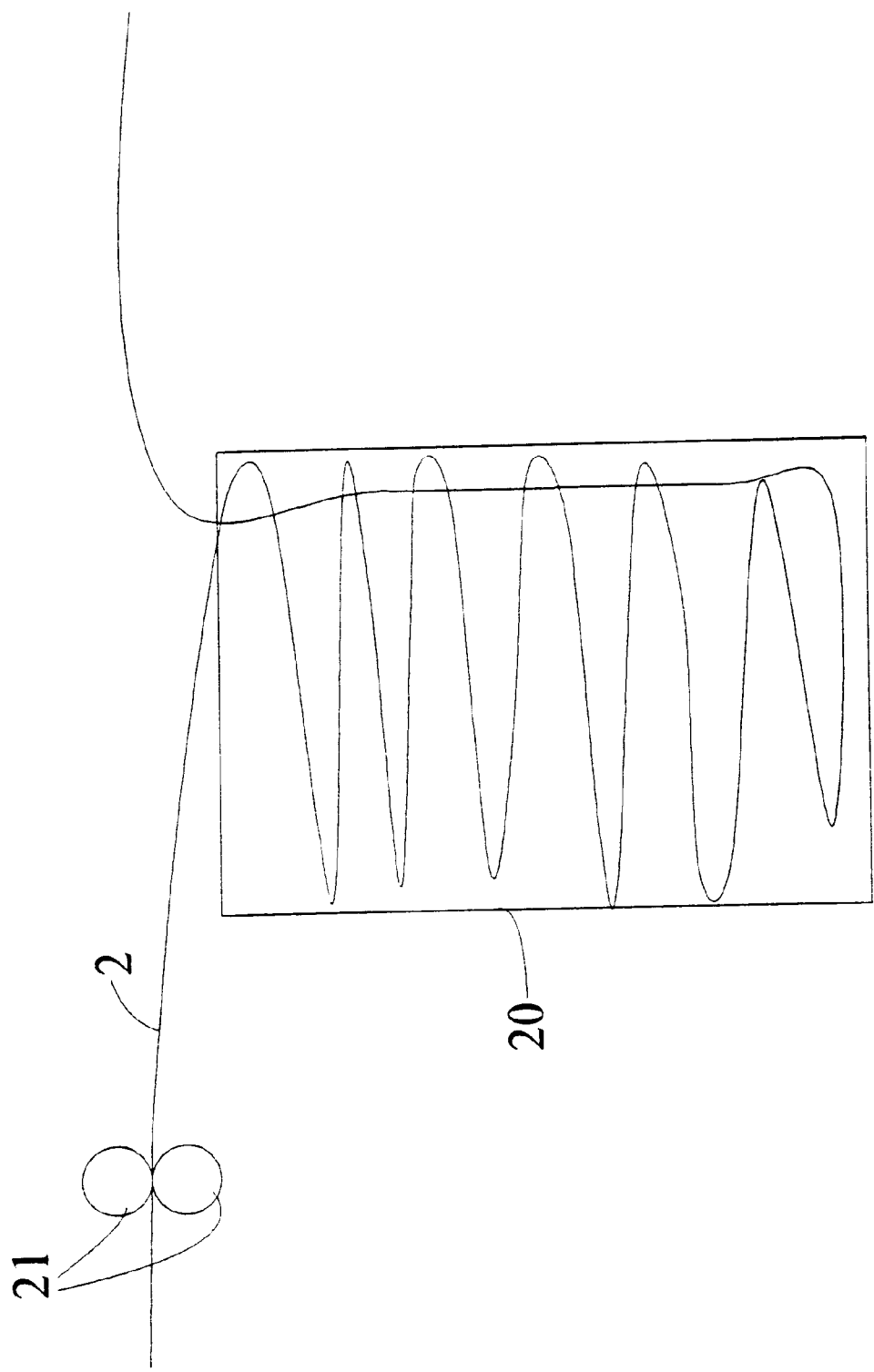
FIG. 5 is a side view of a third embodiment of a fiber buffer according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Referring to FIG. 1, the fiber-optic cable manufacturing apparatus shown therein includes fiber reels 1, which are conventional factory reels. In the embodiment according to the invention, the optical fibers 2 are reeled off from reels 1 tangentially with respect to the perimeter of the cylindrical reels, whereby no torsional stresses will be imposed on the fiber 2. From the factory reels 1, the fibers 2 are routed at the exhaustion of the fiber via a fiber exhaustion detector 3 to a splicing device 4, and therefrom, to an active buffer 5. The fiber exhaustion detector 3 may be implemented by optical means, or alternatively, using mechanical sensors. When the fiber is exhausted, the detector 3 issues an alarm and a signal for the fiber buffer 5 to start reeling off the fiber 2 accumulated therein. The splicing device 4 can be an apparatus capable of making a flawless optical splice, e.g., of the type commercially available and typically used for making a field splice in conjunction with the repair of cable damages. Alternatively, the splicing device 4 may be a simpler factory-splicing apparatus that only joins the fibers 2 with a temporary knot or glued splice. Furthermore, the splicing device 4 may within the scope of the invention be a splicer unit joining a bundle of fibers to another fiber bundle.

The fiber buffer 5 is followed by a conventional cable manufacturing process with a sheathing line 6 in which a polymer sheath is formed about the fiber bundle, and when required, a filler material is introduced enclosing the fibers under the sheath. Typically, the sheathing line 6 includes an extruder adapted to form a sheath about the fibers from a melted polymer raw material. Subsequent to the extruder is typically adapted a cooling line formed by a series of water baths at different temperatures, permitting controlled processing of the polymer sheath. While the line run speed is typically in the order of 100 m/min, production lines with higher speeds are being designed. From the sheathing line 6, the finished cable 15 is taken to a continuously running upwinder having two uptake rolls 7 and 8 in order to allow for an uninterrupted process.

As shown in FIG. 2, the cable 15 made in the process of FIG. 1 comprises optical fibers 2 whose number in the cable cross section illustrated in the diagram is 16. The length of the fibers 2 typically varies in the range 4000–25,000 m. Prior to the cable manufacturing process, the fiber 2 is coated with a so-called primary coating 18 which may be colored with a suitable coding color if so desired. Typically, the diameter of the fiber 2 is 125 μm. A suitable protective gel 17 is extruded about the fibers 2 to seal the fibers 2 against moisture. The secondary sheath 16 is formed essentially simultaneously with the gel extrusion about the fibers 2 by extrusion using melted polymer. The outer diameter of the cable 15 is typically about 5–10 mm. Typically, the cables 15 are combined into larger-diameter cables called stranded cables in which the total number of cables can be 48, for instance.

With reference to FIG. 3, the active fiber buffer 5 shown therein may in its simplest embodiment be a system formed by a single dancer sheave 11, whereby the fiber 2 in the running process is passed over fixed sheaves 10 and 9 to the dancer sheave 11 such that in the normal operating state the sheave 11 is kept in its lowermost position, and when a splice is being made, the sheave 11 is elevated thus permitting the fiber on the ingoing side of the buffer system to be halted for splicing. Due to the limited buffer capacity of the system shown in FIG. 3, this embodiment permits only a temporary splice to be formed between the fiber ends. If the travel of the sheave 11 is made to be 5 m, for instance, the system gives a fiber buffer reserve of 10 m, whereby a splicing time of 6 seconds remains at full line speed. Such a short time is sufficient for making a so-called temporary factory splice that has no optical continuity properties.

When the cable is made using temporary factory splices, the location of the splice must be marked on the cable or recorded in the memory of the equipment to permit later elimination of the temporary factory splice from the cable.

As shown in FIG. 4, the active fiber buffer may be made/designed as a multipass system, in which case the active travel of 5 m allowed for the dancer sheave provides a six-fold buffer capacity as compared with the system illustrated in FIG. 3. Then, the splicing time is extended to 36 s, which may already be considered sufficient for making an optically functional splice. Here, the sheave set 13 may be fixed and the sheave set 12 movable. However, within the scope of the invention it is obviously irrelevant which one of the sheave sets is made movable, and even both sheave sets can be designed movable. The only constraint to the number of multipass travels within the buffer system 5 is dictated by the free space available in the vicinity of the cable manufacturing equipment. The lateral space need of the sheaves is minimal.

With reference to FIG. 5, the active buffer may also be designed into a container 20 in which the end length of the fiber 2 is forced to fold with the help of a compressed air jet and from which the fiber is reeled off during the splicing of the fiber. Instead of a compressed air jet, the fiber 2 could be forced into the container 20 by means of, e.g., a sheave pair 21. It must be noted that the buffering of the fiber into the container 20 is done actively only when the fiber 2 is close to its end.

Alternatively, the buffer 5 may also be implemented with the help of a variator-type variable-diameter cone system in which the capacity of the fiber buffer is controlled by adjusting the longitudinal position of the cones.

The buffer 5 can be designed for single fibers as well as entire fiber bundles. When the temporary factory splice is made by glueing the ends of the entire fiber bundle together, also the buffer 5 must be implemented as a bundle buffer.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for continuously manufacturing fiber-optic cable, comprising the step of:

forming single, cut-to-length, optical fibers into a fiber-optic cable enclosed by a secondary sheath, said step of forming including the substeps of;

accumulating a length of a first optical fiber in an active buffer;

detecting the exhaustion of the first optical fiber;

starting to reel off, in response to said detecting step, the accumulated length of the first optical fiber from said active buffer; and joining the trailing end of the first optical fiber to an end of a second optical fiber using a splicing operation, said joining step occurring after said starting step.

2. The method as in claim 1, wherein a separate active buffer is provided for each fiber.

3. The method as in claim 1, wherein a single active buffer is provided for the entire bundle of fibers.

4. The method as in claim 1, wherein the fibers are connected to each other by an optically functional splice.

5. The method as in claim 1, wherein the fibers are connected to each other by a temporary factory splice lacking optical continuity properties.

6. The method as in claim 5, wherein the temporary splices are removed from the finished cable.

7. The method as in claim 1, wherein the exhausted fiber is accumulated in a container prior to its exhaustion.

8. An apparatus for supplying fiber-optic cable, said apparatus comprising:

a detector suitable for detecting the exhaustion of a first optical fiber;

a splicer suitable for joining an end of the first optical fiber to an end of a second optical fiber;

an active buffer suitable for accumulating a length of the first optical fiber, wherein said active buffer, in response to said detector detecting exhaustion of the first optical fiber, starts to reel off accumulated length of the first optical fiber thus enabling said splicer to join the trailing end of the first optical fiber to an end of the second optical fiber.

9. The apparatus as in claim 8, wherein a separate active buffer is provided for each fiber in the apparatus.

10. The apparatus as in claim 8, wherein a single active buffer is provided for the entire bundle of fibers.

11. The apparatus as in claim 8, wherein said splicing device is capable of connecting the fibers to each other by an optically functional splice.

12. The apparatus in claim 8, wherein said active buffer is formed by a single moving sheave.

13. The apparatus as in claim 8, wherein said active buffer is formed by a multipass movable sheave assembly.

14. The apparatus as in claim 8, wherein the exhausted fiber is accumulated in a container prior to its exhaustion.

* * * * *